United States Patent
Vlutters et al.

(10) Patent No.: US 7,995,441 B2
(45) Date of Patent: Aug. 9, 2011

(54) REAL TIME POWER CONTROL FOR OPTICAL RECORDING DRIVES

(75) Inventors: Ruud Vlutters, Eindhoven (NL); Bin Yin, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 398 days.

(21) Appl. No.: 12/282,565

(22) PCT Filed: Mar. 5, 2007

(86) PCT No.: PCT/IB2007/050706
§ 371 (c)(1),
(2), (4) Date: Sep. 11, 2008

(87) PCT Pub. No.: WO2007/105139
PCT Pub. Date: Sep. 20, 2007

(65) Prior Publication Data
US 2009/0097368 A1    Apr. 16, 2009

(30) Foreign Application Priority Data
Mar. 13, 2006 (EP) .................................. 06111031

(51) Int. Cl.
*G11B 7/0045* (2006.01)
(52) U.S. Cl. ................................... 369/59.11
(58) Field of Classification Search .................. None
See application file for complete search history.

(56) References Cited

U.S. PATENT DOCUMENTS

| | | | |
|---|---|---|---|
| 5,745,467 A * | 4/1998 | Sakaue et al. | 369/59.11 |
| 6,157,609 A * | 12/2000 | Shoji et al. | 369/275.3 |
| 6,345,026 B1 * | 2/2002 | Furukawa et al. | 369/59.11 |
| 6,678,228 B1 * | 1/2004 | Kando et al. | 369/47.51 |
| 6,920,097 B2 | 7/2005 | Kim | |
| 2003/0048712 A1 | 3/2003 | Bakx et al. | |
| 2004/0004916 A1 * | 1/2004 | Nadershahi | 369/47.5 |
| 2004/0156286 A1 | 8/2004 | Miyaki | |
| 2006/0077831 A1 * | 4/2006 | Kim | 369/47.29 |
| 2009/0097368 A1 * | 4/2009 | Vlutters et al. | 369/47.15 |

FOREIGN PATENT DOCUMENTS

| | | |
|---|---|---|
| EP | 1045378 A2 | 10/2000 |
| EP | 1619674 A1 | 1/2006 |
| JP | 2001312822 | 11/2001 |
| WO | 2005008641 A2 | 1/2005 |

OTHER PUBLICATIONS

The Written Opinion of the International Searching Authority, PCT/IB2007/050706, mailed Aug. 1, 2007.

* cited by examiner

Primary Examiner — Peter Vincent Agustin

(57) ABSTRACT

The invention discloses an optical recording drive for recording data on an optical carrier such as an optical disk of the DVD or BD format. A radiation source is arranged to emit a write pulse train (80) for writing an optically detectable effect (90) i.e. a pit or mark. Photo detection means (10) detects a first reflected radiation beam pulse (R1) from a start time portion of the write pulse train (80) and generates a corresponding first signal (PS1) indicative of the power in the first pulse, the photo detection means (10) further detects a second reflected radiation pulse (R2) from an end time portion of the write pulse train (80) and generates a corresponding second signal (PS2) indicative of the power in the second pulse. By comparing (e.g. the heights of) the first signal (PS1) and the second signal (PS2), it is possible to get an indication of the received power in the optically detectable effect (90) as delivered by a power level (81; 82) in the write pulse train (80) continuously during writing and for a broad range of carrier rotation speeds.

22 Claims, 8 Drawing Sheets

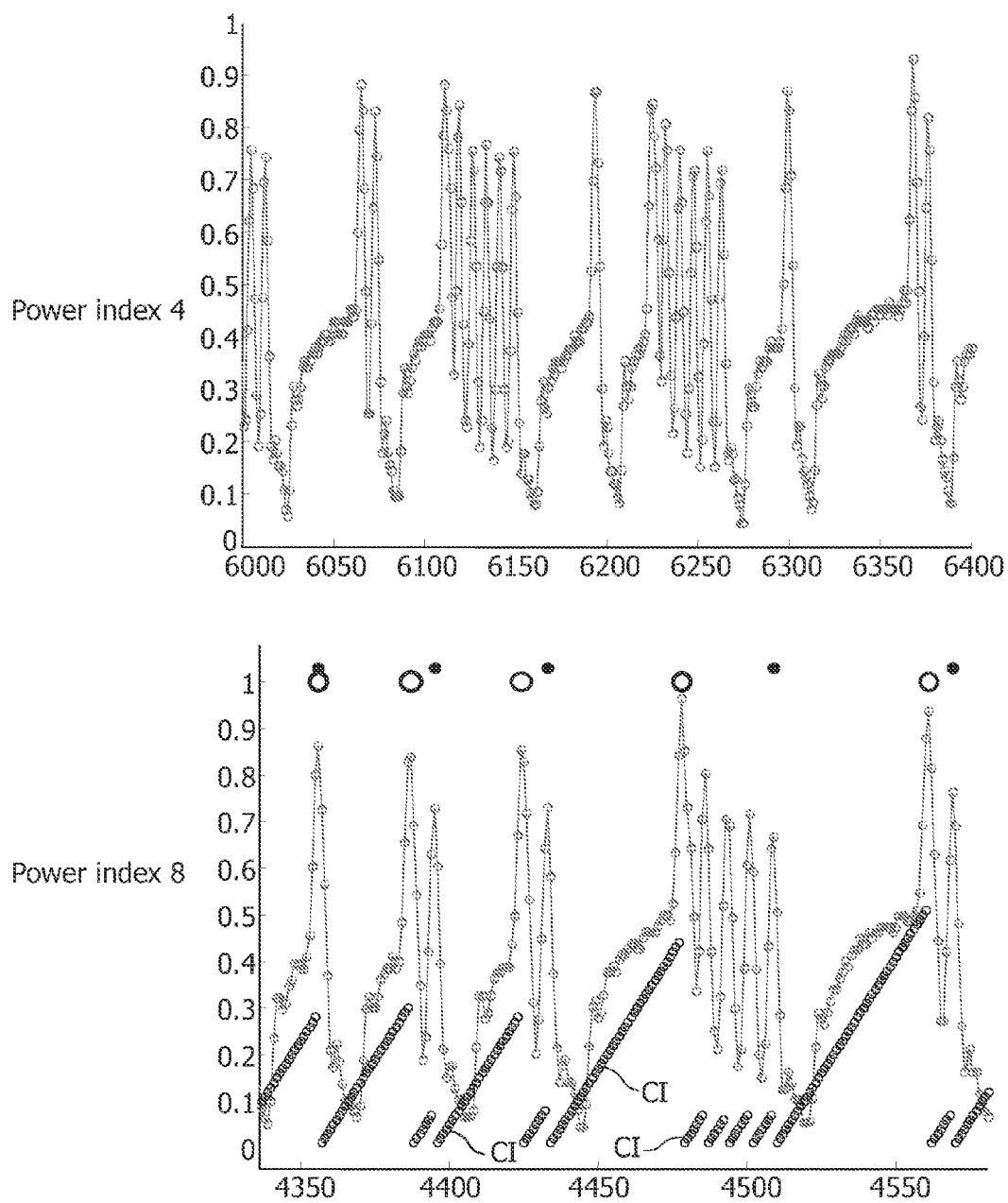
FIG. 6-I

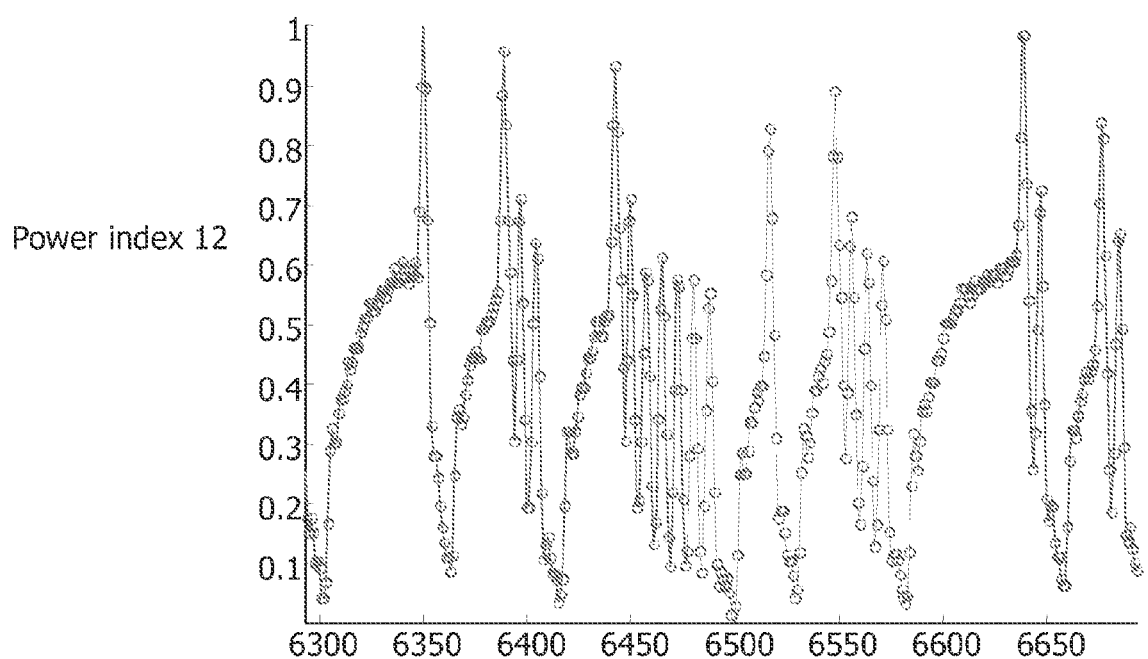
FIG. 6-II

REAL TIME POWER CONTROL FOR OPTICAL RECORDING DRIVES

The present invention relates to an optical recording drive adapted for recording data on an associated optical carrier such as an optical disk of the DVD or BD format. The invention also relates to a corresponding method for operating an optical recording drive and corresponding processing means to control an optical recording drive.

During optical recording of an optical disk or carrier, for rewriteable media, a laser beam is applied to selectively crystallize or make amorphous a phase-changing material in dependency of the data to be written on the optical disk or carrier. Equally, for write-once media, a laser beam is applied to selectively to alter/burn away/deform (dye) material or not, in dependency of the data to be written on the optical disk or carrier. The optimum amount of laser power needed for optical media recording depends inter alia on the specific medium, on the recording speed and may even depend on the location on the medium. It is crucial that the correct power is applied, since incorrect laser power settings may result in incorrect optical effects, such as too small or too large effects.

The laser power control (LPC) may be performed by sampling a laser beam feedback signal from a photo diode named the forward sense (FS). Alternatively, the laser power may be controlled by read-back of written data on the media itself—either continuously ("running") or semi-continuously ("walking").

Figure 1:
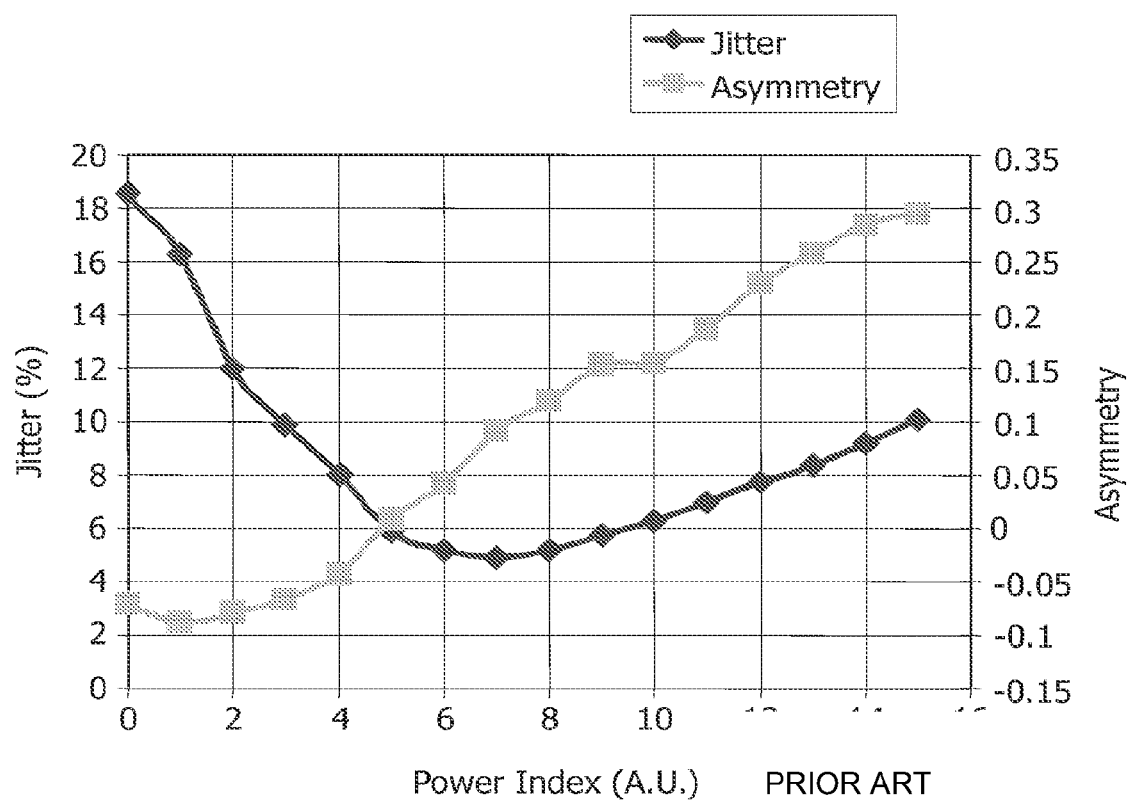

In current generation DVD (digital versatile disk) drives and next generation BD (Blu-Ray) drives, the "walking" read-back approach is normally applied. After a first power optimization at the inner radius, e.g. in a power calibration area (PCA), the asymmetry and the jitter is measured under the found optimal settings. After writing several tracks (up to 100 tracks), the last track is read-back, and the asymmetry and the jitter are measured again. When the track appears to have a higher asymmetry than the found optimum, the writing power is reduced, and similarly, if the track has too little asymmetry, the write-power is increased. This method of semi-continuous adaptation of the write-power is called "walking" optimum power control (OPC), because only at specified steps (positions) is the write power modified. In FIG. 1, typical optimization curves of the jitter and the asymmetry versus the laser power (power index) can be found for a write-once disk.

In US 2004/0156286, a running OPC control recording technique is disclosed. The disk drive irradiates a disk with an optical spot and detects a spatially separated front and rear power level of the reflected optical spot. Based on the level difference between the front and rear power level at a sample time an assessment of the power in the optical spot is obtained. The technique thereby provides running OPC for an optical recording drive based on the variation of the reflectivity during pit formation in the stack of the optical disk. The teaching of this reference is, however, limited to a quite simple writing process where the laser power is constantly "on" during the pit formation. The sampling of the front and rear power level is then performed after transients in the detected power signal. Consequently this OPC technique effectively does not apply a write strategy apart from a very simple block-type of writing. Application of a write strategy, i.e. the conversion of encoded data to a pulse train with high time resolution and multiple power levels, is essential for reliable recording on many optical disks, in particular for rewriteable disks. Thus, the technique disclosed in US 2004/0156286 is restricted to optical recording with a limited number of write-once disks, and possibly only recording at relatively high revolution speed where the need for the power dissipation within the stack of the optical disk is more limited.

Hence, an improved optical recording drive would be advantageous, and in particular a more efficient and/or reliable optical recording drive would be advantageous.

Accordingly, the invention preferably seeks to mitigate, alleviate or eliminate one or more of the above-mentioned disadvantages singly or in any combination. In particular, it may be seen as an object of the present invention to provide an optical recording drive that solves the above mentioned problems of the prior art with power control of an applied radiation beam.

This object and several other objects are obtained in a first aspect of the invention by providing an optical recording drive adapted for recording data on an associated optical carrier, the optical recording drive comprising:

a radiation source capable of emitting a radiation beam, said beam being adapted to write information on the optical carrier as optically detectable effects, a write strategy generator capable of providing the radiation source with a write strategy for an optically detectable effect, the radiation source being arranged to emit a corresponding write pulse train for writing the optically detectable effect, said write pulse train comprising at least an upper and a lower level of power, photo detection means arranged to detect reflected radiation from the optical carrier, said photo detection means being capable of detecting a first reflected radiation pulse from a start time portion of the write pulse train and generating a corresponding first signal indicative of the power in the first pulse, the photo detection means further being capable of detecting a second reflected radiation pulse from an end time portion of the write pulse train and generating a corresponding second signal indicative of the power in the second pulse, and processing means for comparing said first signal and said second signal so as to obtain an indication of the received power in the optically detectable effect (90) as delivered by a power level in the write pulse train.

The invention is particularly, but not exclusively, advantageous for obtaining an indication of the received power in the optically detectable effect as delivered by a power level of the pulse train, e.g. the upper or the lower power level of the write pulse train, in a continuous manner, i.e. "running" OPC for both rewriteable optical carriers (RE or RW) and write-once optical carriers (R). The received power may further be obtained for a wide range of carrier revolution speeds compared to the hitherto known OPC methods.

Additionally, comparing the first and the second reflected pulse within a single write pulse train has the effect that the received power indication is effectively obtained from the reflected light of a single local position (i.e. the written effect under formation) on the optical carrier, and it is thereby possible to compensate or avoid influence from large scale variations (i.e. low frequency variations) on the optical carrier. Variations may include fingerprints on the optical carrier, manufacturing variations (thickness, material inhomogeneity, etc.) within the stack layers of the optical carrier. It should be emphasized that the present invention is capable of assessing the actually received power in the optically detectable effect of the carrier, e.g. the pit or mark, and not just a power level of the incoming write pulse train, though the received power is—of course—delivered by the incoming write pulse train. If for instance the power levels of the write pulse train are correctly adjusted, the presence of a finger print on the carrier may nevertheless reduce the transmitted radiation for writing a pit or mark in the stack of the carrier resulting in a writing failure if not compensated for. By the present invention the actually received power in the optically detectable effect is assessed making compensation for e.g. finger prints possible in a fast and effective manner. Furthermore, application of the present invention may obviate or lower the need for dedicated power calibration areas (PCA) on the optical carrier. The present invention is based on utilization of novel insights into the dynamics of pit/mark formation in the stack of an optical carrier. The reflection of light from a pit/mark under formation is a complicated process to understand in depth inter alia due to the fact that the reflectivity of a pit/mark during formation is strongly dependent on the applied radiation power itself. However, as will be more evident below, the present inventors have made a series of experimental studies that nevertheless demonstrate that by application of relatively simple measures from reflected light portions of a write pulse train it is possible to obtain an indication of the received power in the optically detectable effect as delivered by a power level in the write pulse train. Comparison of the reflected light portions resulting from a single write pulse train makes it necessary that the photo detection means has a sufficient temporal resolution so as to enable sampling of the first and second reflected radiation pulses at different times. Thus, the present invention requires a certain minimum time resolution of the photo detection means depending on the recording conditions, in particular the write strategy applied.

In an embodiment, the processing means may be adapted to compare the first signal and the second signal by calculating a ratio between said first signal and said second signal. By calculating a ratio between e.g. a height parameter of the signals, it is thereby possible to compensate for a reduction of the transmission (T) through the carrier. Further, the effect of defects or fingerprints on the carrier may be reduced, possibly eliminated, by calculating said ratio in the performed power assessment. In an alternative embodiment, the processing means may be adapted to compare the first signal and the second signal by calculating a difference between said first signal and said second signal.

In an advantageous embodiment, the first and the second signal may be a central aperture signal (CA) from the optical carrier. The central aperture (CA) signal is normally obtained from the optical carrier during read-out and thereby the present invention may easily be implemented by moderate modification of existing optical recording drives. Advantageously, the optical drive may be adapted to identify the first and second signal by analysis of the central aperture (CA) signal during writing. This is possible using the encoding scheme of the data to be written as it will be explained in more detail below.

In an embodiment, the optical drive may additionally or alternatively be adapted to identify the first and second signal of the write pulse train from data provided to the write strategy generator e.g. the no-return-to-zero (NRZ) data. Alternatively or additionally, the optical drive may be adapted to identify the first and second signal of the write pulse train from data provided from the write strategy generator. Thus, the control signal from the write strategy generator to the radiation source may for instance also be transmitted to the processing means so as to identify first and second signal of the write pulse train.

In an embodiment, the processing means may be adapted to obtain an indication of the received power in the optically detectable effect as delivered by a power level in the write pulse train by utilizing the time difference of said first signal and said second signal. If, for example, the first signal corresponds to the very first write pulse in the write pulse train, and similarly the second signal corresponds to the very last write pulse in the write pulse train the time difference will be close to the run length period of the optical effect being written on the optical carrier. This may simplify the identification of the first and second signal.

In an embodiment, the photo detection means may have a sampling frequency of said first and/or said second signal being substantially larger than a clock frequency of the data to be recorded on the optical carrier. For a sufficient resolution the sampling frequency of said first and/or said second signal may be at least 2, 3, 4, 5, 6, 7, 8, 9, 10, 11, 12, 13, 14, 15, 16, 17, 18, 19, 20, 21, 22, 23, 24, or 25 times larger than the clock frequency of the data to be written. Usual sampling frequency of the first and second signal applicable for BD recording may be at least 66 MHz for 1× recording speed. BD recording speed may go from 1× to 10×.

In an embodiment, the upper power level in the write pulse train may be adapted for erasing an optically detectable effect on the optical carrier. Thus, the present invention may also find application for rewriteable (RE) carriers such as a carrier of the DVD±RE or BD±RE format.

In a second aspect, the present invention relates to processing means for controlling the operation of an associated optical recording drive adapted for recording data on an optical carrier, the optical drive comprising:
  a radiation source capable of emitting a radiation beam, said beam being adapted to write information on the optical carrier as optically detectable effects,
  a write strategy generator capable of providing the radiation source with a write strategy for an optically detectable effect, the radiation source being arranged to emit a corresponding write pulse train for writing the optically detectable effect, said write pulse train comprising at least an upper and a lower level of power,
  photo detection means arranged to detect reflected radiation from the optical carrier, said photo detection means being capable of detecting a first reflected radiation pulse from a start time portion of the write pulse train and generating a corresponding first signal indicative of the power in the first pulse, and
  the photo detection means further being capable of detecting a second reflected radiation pulse from an end time portion of the write pulse train and generating a corresponding second signal indicative of the power in the second pulse,
  wherein the processing means is adapted to compare said first signal and said second signal so as to obtain an indication of the received power in the optically detectable effect as delivered by a power level in the write pulse train.

In a third aspect, the invention relates to a method for operating an optical recording drive adapted for recording data on an optical carrier, the method comprising the steps of:
  emitting a radiation beam by a radiation source, said beam being adapted to write information on the optical carrier as optically detectable effects,
  providing the radiation source with a write strategy from a write strategy generator for writing an optically detectable effect, the radiation source being arranged to emit a corresponding write pulse train for writing the optically detectable effect, said write pulse train comprising at least an upper and a lower level of power,
  detecting reflected radiation from the optical carrier by photo detection means, said photo detection means being capable of detecting a first reflected radiation pulse from a start time portion of the write pulse train and generating a corresponding first signal indicative of the power in the first pulse,
  detecting a second reflected radiation pulse by the photo detection means from an end time portion of the write pulse train and generating a corresponding second signal indicative of the power in the second pulse, and comparing said first signal and said second signal by processing means so as to obtain an indication of the received power in the optically detectable effect as delivered by a power level in the write pulse train.

In a fourth aspect, the invention relates to a computer program product being adapted to enable a computer system comprising at least one computer having data storage means associated therewith to control an optical recording drive according to the third aspect of the invention.

This aspect of the invention is particularly, but not exclusively, advantageous in that the present invention may be implemented by a computer program product enabling a computer system to perform the operations of the second aspect of the invention. Thus, it is contemplated that some known optical recording drive may be changed to operate according to the present invention by installing a computer program product on a computer system controlling the said optical recording drive. Such a computer program product may be provided on any kind of computer readable medium, e.g. magnetically or optically based medium, or through a computer based network, e.g. the Internet.

In a fifth aspect, the invention relates to an optical recording carrier for recording information by irradiating the optical recording carrier by means of a radiation beam, the optical recording carrier comprising an area containing control information indicative of a recording process whereby information can be recorded on said recording carrier, the control information comprising values of recording parameters for the recording process, wherein the control information comprises information related to the comparison of the first and second signal in the method according to the third aspect, or the optical drive according to the first aspect.

The first, second, third, fourth and fifth aspect of the present invention may each be combined with any of the other aspects. These and other aspects of the invention will be apparent from and elucidated with reference to the embodiments described hereinafter.

Figure 2:
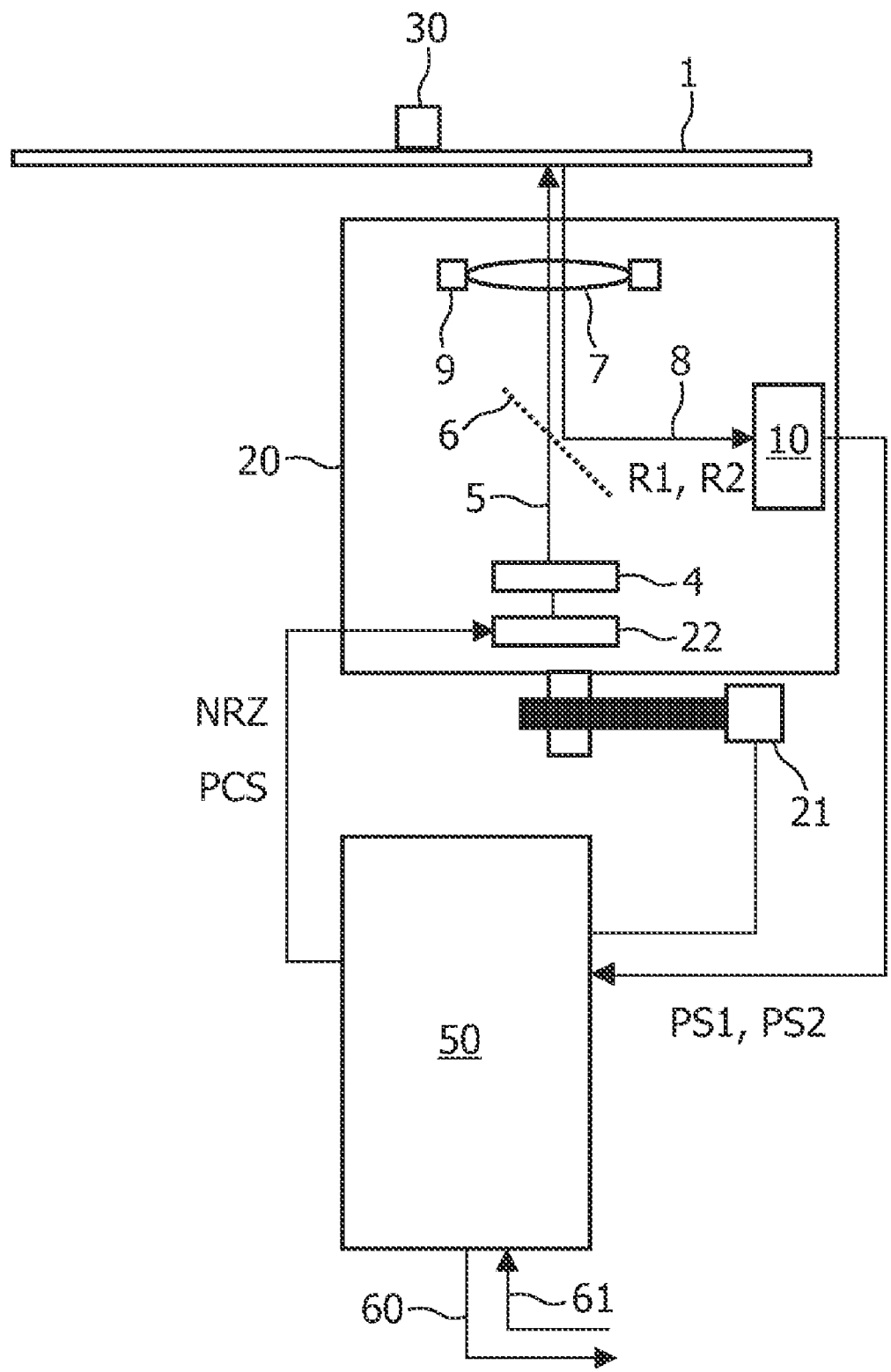
Figure 3:
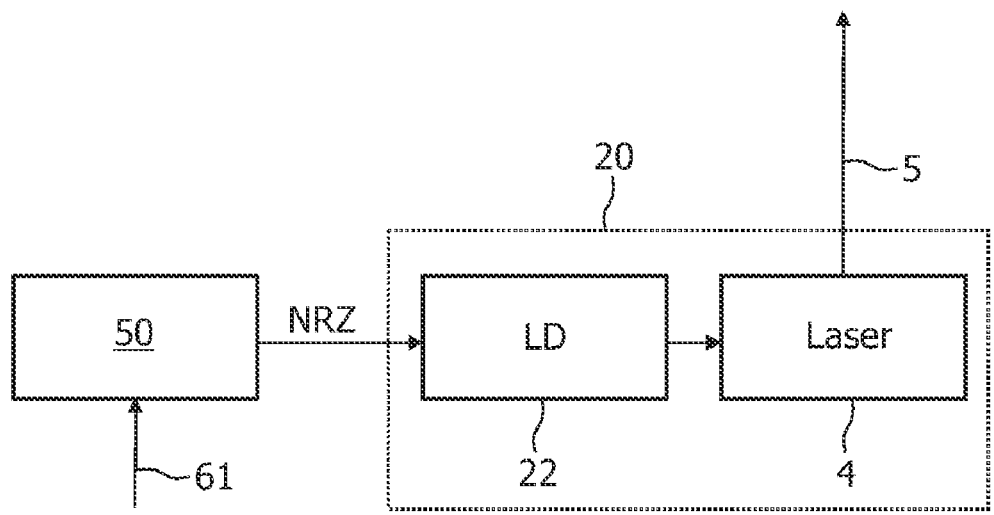
Figure 4:
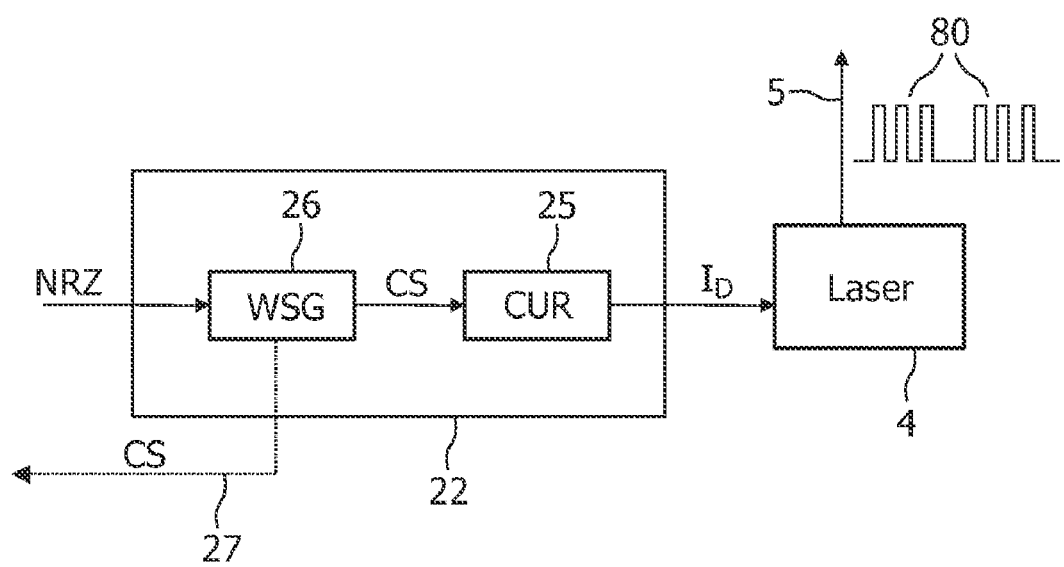
Figure 5:
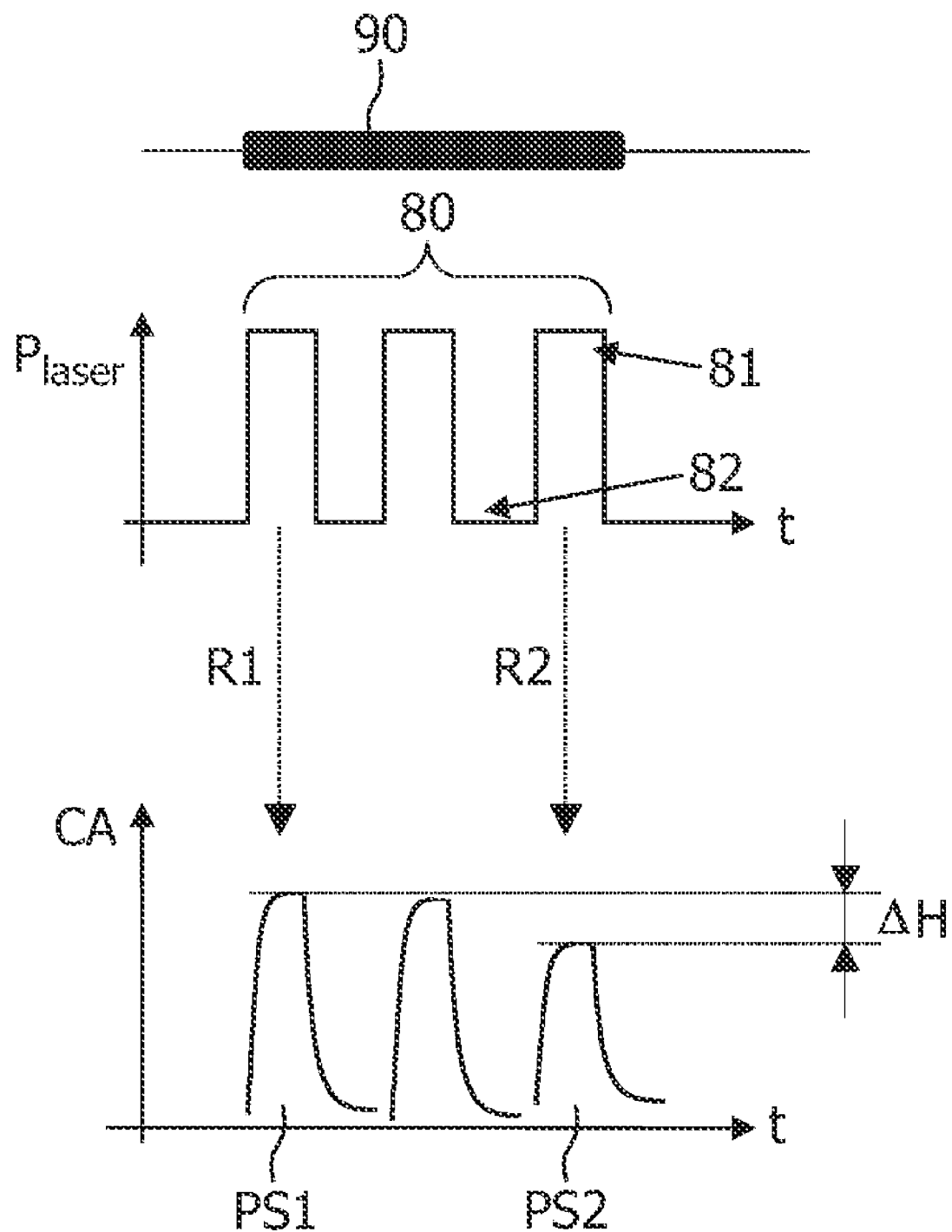
Figure 7A:
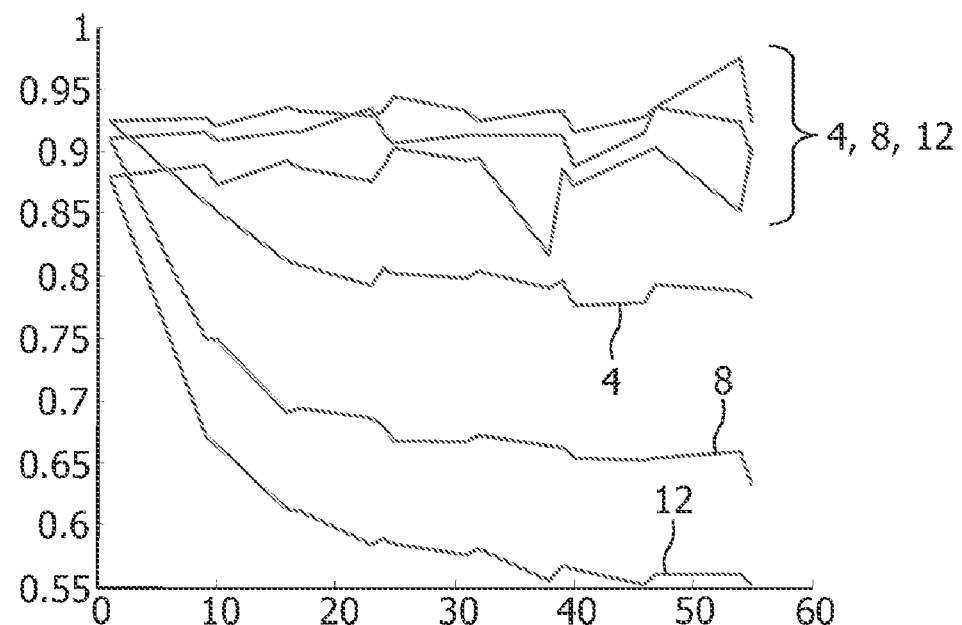
Figure 7B:
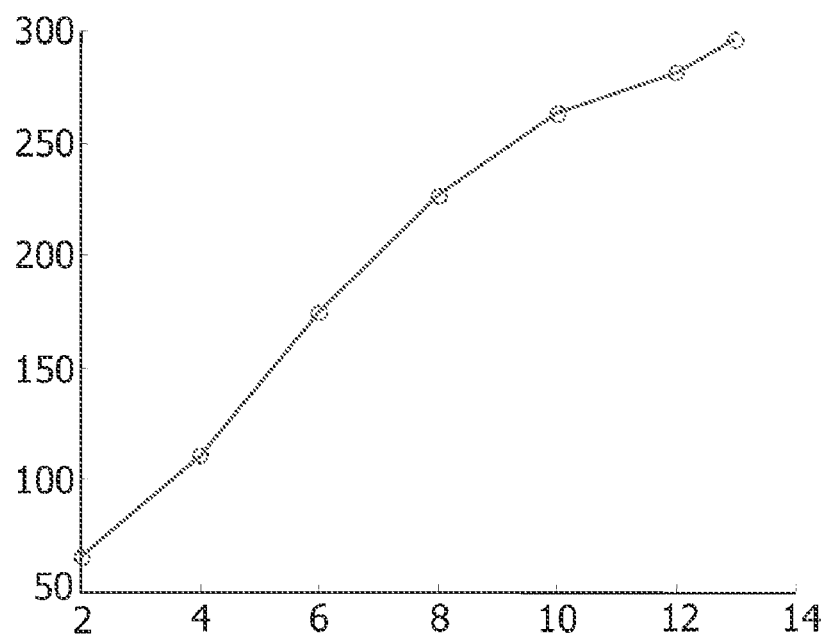
Figure 8:
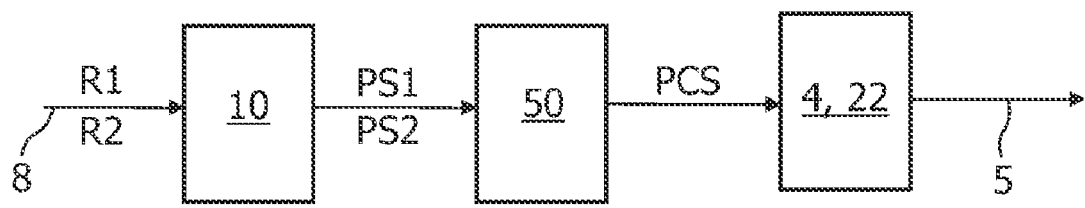
Figure 9:
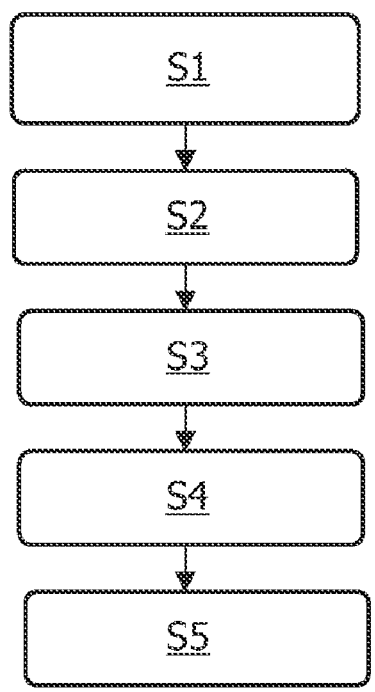

The present invention will now be explained, by way of example only, with reference to the accompanying Figures, where FIG. 1 shows typical optimization curves of the jitter and the asymmetry versus the laser power (power index) for a write-once disk, FIG. 2 is a schematic drawing of an optical recording drive according to an embodiment of the present invention, FIG. 3 is a schematic drawing showing how no-return-to-zero (NRZ) data are processed and radiation is emitted in response thereto, FIG. 4 is similar to FIG. 3 showing in more detail how the write strategy is formed and corresponding write pulse trains are emitted, FIG. 5 is a schematic drawing showing in time how an optically detectable effect is formed by a write pulse train with alternating power levels, and how the reflected radiation results in a corresponding central aperture (CA) signal, FIG. 6 shows three graphs measuring the reflected radiation as a function of time at three different power levels, FIG. 7 shows two different analysis methods of the data contained in the graphs of FIG. 6, FIG. 8 is a schematic channel of the reflected radiation pulses, the corresponding power signals, and the power control signal derived from the power signals, and FIG. 9 is a flow-chart of a method according to the invention.

FIG. 1 shows optimization curves of the jitter (left scale) and the asymmetry (right scale) versus the laser power (given as a power index, i.e. arbitrary units (A.U.)) for a write-once disk of the Cu/Si stack type. As seen in the graph, the asymmetry is in general an increasing function of the laser power having a minimum at very low power, whereas the jitter has a minimum at a relatively higher laser power level. These two OPC measures of the written marks/pits are routinely measured in present optical drive technology and applied for "walking" optimum power control (OPC). As will be appreciated, the present invention provides a superior OPC solution that may replace or supplement these OPC measures by providing a "running" OPC that may be applied for many different kinds of optical media and/or recording conditions.

FIG. 2 shows an optical recording apparatus or drive and an optical information carrier 1 according to the invention. The carrier 1 is fixed and rotated by holding means 30.

The carrier 1 comprises a material suitable for recording information by means of a radiation beam 5. The recording material may, for example, be of the magneto-optical type, the phase-change type, the dye type, metal alloys like Cu/Si or any other suitable material. Information may be recorded in the form of optically detectable effects, also called "marks" for rewriteable media and "pits" for write-once media, on the optical carrier 1.

The optical apparatus i.e. the optical drive comprises an optical head 20, sometimes called an optical pick-up (OPU), the optical head 20 being displaceable by actuation means 21, e.g. an electric stepping motor. The optical head 20 comprises a photo detection system 10, a laser driver device 30, a radiation source 4, a beam splitter 6, an objective lens 7, and lens displacement means 9 capable of displacing the lens 7 both in a radial direction of the carrier 1 and in the focus direction.

The function of the photo detection system 10 is to convert radiation 8 reflected from the carrier 1 into electrical signals. Thus, the photo detection system 10 comprises several photo detectors, e.g. photodiodes, charged-coupled devices (CCD), etc., capable of generating one or more electric output signals. The photo detectors are arranged spatially to one another and with a sufficient time resolution so as to enable detection of error signals, i.e. focus error FE and radial tracking error RE. The focus error FE and radial tracking error RE signals are transmitted to the processor 50 where commonly known servomechanism operated by usage of PID control means (proportional-integrate-differentiate) is applied for controlling the radial position and focus position of the radiation beam 5 on the carrier 1.

The radiation source 4 for emitting a radiation beam or a light beam 5 can for example be a semiconductor laser with a variable power, possibly also with variable wavelength of radiation. Alternatively, the radiation source 4 may comprise more than one laser. In the context of the present invention the term "light" is considered to comprise any kind of electromagnetic radiation suitable for optical recording and/or reproduction, such as visible light, ultraviolet light (UV), infrared light (IR), etc.

The radiation source 4 is controlled by the laser driver device (LD) 22. The laser driver (LD) 22 comprises electronic circuitry means (not shown in FIG. 2) for providing a drive current to the radiation source 4 in response to a clock signal and a data signal NRZ transmitted from the processor 50. The processor 50 receives feedback, i.e. the first and second power signals PS1 and PS2, from the photo detection means 10 so as to assess the actual value of the received power in the optically detectable effect as delivered by a power level of a write pulse train within the irradiation beam 5. If a deviation exits between the desired target level of power received by the optically detectable effect and the actual value of the relevant received power as delivered by the beam 5, the processor 50 may generate appropriate control signals PCS to the laser driver 22 and the radiation source 4 to correct the actual power level correspondingly. Thus, a feedback control loop is established to control the power of the irradiation beam 4 and in turn the received power in the optically detectable effect. The deviation between the desired target level of power and the actual value of the power in beam 5 is defined as a power error, and the function of the laser power control loop is to minimize, and if possible eliminate, the power error. By the present invention the received power in an optically detectable effect is assessed and therefore the power error is defined for the received power in the optically detectable effect. Alternatively or additionally, a power error for the laser beam 5 itself may be defined and applied for optimisation as it is done with for example the forward sense (FS) power monitoring.

The processor 50 receives and analyses signals from the photo detection means 10. The processor 50 can also output control signals to the actuation means 21, the radiation source 4, the lens displacement means 9, and the rotating means 30, as schematically illustrated in FIG. 1. Similarly, the processor 50 can receive data to be written, indicated at 61, and the processor 50 may output data from the reading process as indicated at 60. While the processor 50 has been depicted as a single unit in FIG. 2, it is to be understood that equivalently the processor 50 may be a plurality of interconnecting processing units positioned in optical recording apparatus, possibly some of the units may be positioned in the optical head 20.

FIG. 3 illustrates the present invention in a simplified block diagram, where some elements of FIG. 1 are shown again. In particular, the processor 50 receives data 61 to be written on the carrier 1, and the processor 50 converts the data 61 to encoded data NRZ (no-return-to-zero) according to an appropriate standard for the relevant recording technology in question. The data NRZ together with a corresponding clock signal (not shown) is transmitted to the laser driver device (LD) 22 for converting the NRZ data to a pulse train of drive current to the radiation source 4, e.g. a laser, where the radiation source 4 in response to the drive current emits a radiation beam 5 with an alternating power level, i.e. a write pulse train. The laser driver device 22 and the laser 4 are positioned in the OPU 20 as indicated in FIG. 3. The connection to the processor 50 is through a flat flexible connector (not shown) also known as the "flex".

FIG. 4 is similar to FIG. 3 further showing in more detail how the write strategy is implemented and corresponding write pulse trains 80 within the radiation beam 5 are emitted. The laser driver 22 comprises a write strategy generator (WSG) 26 and a connected current source (CUR) 25. The current source 25 supplies the radiation source or the laser 4 with a drive current $I_D$ in response to the incoming control signal CS from the write strategy generator 26. For generating the control signal CS, the write strategy generator 26 also receives or generates a clocking signal, such as a phase lock loop (PLL), from the processor 50.

In an embodiment of the invention, the control signal CS is additionally transmitted back to the processor 50 as indicated by the dotted arrow 27. By simultaneous analysis of the CS and the reflected radiation 8, identification of the first R1 and second R1 reflected light portions from a pit or mark being written is feasible. Consideration of the delay and/or transients of the control signal CS should be taken into account.

In an alternative embodiment, the data to be written on the carrier transmitted to the laser driver 22, i.e. the NRZ signal, is analyzed in the processor 50 to predict or estimate the emitted write pulse trains 80 for a given set of NRZ data. Detailed knowledge and possibly feed-back regarding the present condition of the laser drive 22 and/or the laser 4 is necessary in order to apply this embodiment.

In yet another embodiment, the identification of the first R1 and second R1 reflected light portions from a pit or a mark is performed by analyzing the central aperture (CA) signal from the photo detection means 10. Knowing the carrier format and the associated encoding scheme it is possible to the analyze the central aperture signal (CA) (also some times called the high-frequency signal (HF)) for first PS1 and second PS2 signals in start time portions and end time portions, respectively, of a write train pulse 80 by knowing the minimum code run length (MRL). If a central aperture peak signal is followed by at least a MRL period, then the said central aperture signal is an end signal from a write pulse train, and the next central aperture signal in time is identified as a first signal from a following write pulse train. This will be illustrated in connection with experimental data given in FIG. 6.

As stated above, the MRL is related to the carrier format. Data recording on various carrier formats, such as the compact disc (CD) format, the digital versatile disc (DVD), and the Blu-Ray disc (BD), is performed by encoding the data according to a standard encoding scheme to obtain a NRZ signal to be transmitted to the optical head 20 for writing. In the table below, corresponding carrier formats and encoding schemes are listed:

| Carrier formats | Encoding scheme | Minimum Code Run Length (MRL) |
|---|---|---|
| CD | 2,10 EFM | 3T |
| DVD | 2,10 EFM+ | 3T |
| BD | 1,7 PP | 2T |

In addition, the minimum code run length (MRL) of each encoding scheme is listed in the right column. The minimum code run length (MRL) indicates the minimum allowable mark or space length as an even multiple of the channel bit length (1T). Thus, for BD the minimum code run length is two times the channel bit length. EFM is the commonly known abbreviation for Eight-to-Fourteen Modulation. The present invention is not limited to the above listed carrier formats. Rather, the invention is particularly suited for optimum power control (OPC) at various writing speeds and/or different types of staking configuration for optical carriers in general.

FIG. 5 is a schematic drawing showing in time how an optically detectable effect 90 is formed by a write pulse train 80 with alternating power levels, respectively a low 82 and a high 81 power level, and how the reflected radiation 8 results in a corresponding central aperture (CA) signal in the photo detection means 10 (see FIG. 1). The reflected radiation 8 comprises a first reflected radiation pulse R1 from a start time portion of the write pulse train 80, i.e. in FIG. 5 R1 origins from the first write pulse in the write pulse train 80, and is detected as the first signal PS1 in the CA signal shown below. Similarly, the second reflected radiation pulse R2 is the reflected light from the third and last write pulse of the write pulse train 80 and is detected as the second signal PS2 in the CA signal. For simplicity, in this schematic drawing the write pulse train 80 comprises just three write pulses as defined by the high power level 81, but more write pulses may of course be applied in a write pulse train 80 in the context of the present invention. Typically, a write pulse train 80 for BD recording comprises between 1 and 10-15 pulses. For the so-called N−1 write strategy writing a mark of length 2 is generally done with 1 pulse, of length 3 with 2 pulses, hence N−1 pulses. For CD and DVD, the shortest run length is 3T, and in this case also N−2 write-strategies are used. Furthermore, there are also blocked strategies, N/2 strategies (12 to 1 pulse, I3→1, I4→2, I5→2, I6→3, etc.), and more complicated non-symmetrical strategies with respect to even and odd effect lengths.

The central aperture (CA) signal in the lower part of FIG. 5 comprises three signals from the photo detection means 10, the three signals being indicative of the power in the respective pulses in the reflected light 8. By comparing the first signal PS1 with the second signal PS2 it is possible to obtain an indication of the received power in the optically detectable effect 90 as delivered by the upper power level 81 within the write pulse train 80. The comparison can be based on various parameters associated with the first PS1 and second PS2 signal. One such parameter could be a height difference ΔH as indicated in FIG. 5, but similarly a ratio of their respective heights may be applied. Likewise, the integrated area value of the first PS1 and second PS2 signals over time can be compared, e.g. subtracted or divided, in order to compare the first PS1 and second PS2 signals and thereby obtain an assessment of the received power in the optically detectable effect 90 as delivered by the upper power level 81 in the write pulse train 80.

In FIG. 5, the first PS1 and second PS2 signal of the CA signal are, respectively, the very first and very last write pulses of the write pulse train 80. However, the first PS1 and second PS2 signal being compared to assess the received power in an optically detectable effect 90 could also be the second, the third, the fourth, the fifth, the sixth, the seventh, the eight, the ninth, the tenth, etc., pulse from the start and end of the write pulse train 80, respectively, provided that the first signal PS1 is from a start time portion of the write pulse train 80, and that the second signal P2 is from an end time portion of the write pulse train 80. Alternatively, the first signal PS1 can be any pulse originating from the initial 5%, 10%, 15%, or 20% of the write pulse train 80. Likewise, the second signal PS2 can be any pulse coming from the final 5%, 10%, 15%, or 20% of the write pulse train 80.

In FIG. 5, the write pulse train 80 comprises an upper 81 and a lower 82 power. Some write strategies apply more than two power levels, and the present invention can readily be applied for such a multi-level power write pulse train too. If the lower power level 82 of the write pulse train 80 has a power level sufficient to result in reflected light pulses in the photo detection means 10 (not the case depicted in FIG. 5) it is possible to apply the teaching of the present invention for obtaining an indication of the received power in an optically detectable effect 90 as delivered by the lower power level 82 by comparison of a reflected light pulse (i.e. the corresponding CA signal) from a start time portion with a reflected light pulse (i.e. the corresponding CA signal) from an end time portion of the write train pulse 80.

Likewise, the teaching of the present invention includes the power level 81 being set to erase an optical detectable effect, i.e. a mark, of a rewriteable (RE) carrier 1. For writing, a laser beam 5 has to heat an area to a temperature exceeding the melting point (usually 500-700° C.) of the polycrystalline stack materials in order to induce a phase transition to an amorphous non-crystalline phase having different optical properties, i.e. reflectivity, and thereby create a mark. To write new marks, i.e. "rewriting" in a previously written area, the laser beam 5 has to heat the old marks to a temperature somewhat below the melting temperature, thus annealing the old marks to a crystalline phase resulting in an erasure of the old marks. During an erase mode of the radiation beam 5, the reflectivity of the mark 90 being deleted changes in a dynamic manner depending on the received power in the mark 90 resulting from the irradiation of the radiation beam 5, thus, the present invention can be applied for obtaining an indication of the received power in the mark 90 as delivered by a power level suitable for erasing a mark 90 on a carrier 1. In general, a write pulse train having a plurality of power levels, e.g. a write level ($P_{write}$), a erase level ($P_{erase}$), and a bias level ($P_{bias}$), may make it difficult to obtain an assessment of the individual contribution from each power level to the power received by the mark 90, and effectively an assessment of the received power in the mark 90 as delivered by more than one power level is obtained.

FIG. 6 shows three graphs of the measured reflected radiation 8 i.e. the central aperture CA signal as a function of time for three different power levels, power index 4, 8, and 12, respectively, during writing on a write-once BD carrier of the Cu/Si stack type. Within this technical field such graphs are also known as high frequency (HF) signals due to the frequency of 25-100 MHz of the CA signal. The measurements were done at 1× BD, i.e. a channel bit frequency of 66 MHz, which was sampled during writing with 500 MHz, in order to ensure correct capture of the peaks. At 1× BD, the disc speed is 4.92 m/s.

Various write pulse trains can visually be identified, but in order to quantize the measurements, peak detection analysis is applied in the processor 50. Peak analysis can be performed in many different ways readily available to the skilled person once the general principle of the present invention is acknowledged. Hence, peak detection on the sampled CA data of FIG. 6 can be based on criteria such as: 1) absolute peak height above a certain level, e.g. 0.4, 0.5 or 0.6 in FIG. 6, 2) level difference with the nearest neighboring points, either absolute or relative, 3) minimum deviation from a running average value of height, etc.

Having located the peaks in the CA data of FIG. 6, a first PS1 and second PS2 signal of a write pulse train are to be identified from the encoding scheme. As explained above in connection with FIG. 4, the peak positions can be combined with the control signal CS from the write strategy generator WSG or similar information from processing of the NRZ data, or the peak positions themselves can be analyzed with respect to the relevant encoding scheme so as to identify or locate CA signals from e.g. first and last write pulses of a write pulse train. In the middle graph of FIG. 6 (power index 8), the result of a peak detection analysis and a first/last write pulse analysis is shown. In the top of the graph are indicated first pulses of a write pulse train by open circles and filled circles indicate last pulses of a write pulse train. The circles positioned on straight, rising lines under the CA data are counting indexes CI between the detected peaks. The counting index CI is not to scale with the vertical axis.

FIG. 7 shows two different analysis methods of central aperture (CA) data as contained in the graphs of FIG. 6:

The upper graph shows the height of the first signals PS1 (upper three curves) and last pulses PS2 (lower three curves) as a function of the delay between the first and last pulse for the three different power levels of FIG. 6. The unit of the delay is given as a difference between first and last pulse position expressed in 500 MHz sample positions, i.e. vs. run length of the written mark, because the difference/ratio will depend on the number of write pulses used/run-length being written. For the three upper curves it is difficult to see any significant difference in PS1 for the three power indexes 4, 8 and 12, respectively. For the three lower curves it is seen that the height of the last signals PS2 is highly dependent on the power index of the radiation beam 5. Thus, for a delay above approximately 5 the height of the second signals PS2 coming from the last pulse of the write pulse train is observed to decrease with increasing power, i.e. a significant lower reflectivity is observed for higher laser power. Accordingly, it is possible to utilize this dependence for obtaining an indication of the received power in an optically detectable effect as delivered by a power level of the radiation beam 5.

The lower graph of FIG. 7 shows the integrated height difference between the first PS1 and second PS2 signal associated with the first and last pulse of a write pulse train, respectively, as a function of the power index (arbitrary units). It is observed that the integrated height difference shows an approximately linear dependence on the power index i.e. the power of the radiation beam 5. Similarly, it is possible to utilize this dependence for obtaining an indication of the received power in an optically detectable effect as delivered by a power level of the radiation beam 5.

It is possible to make a simple model of the central aperture CA signal where the CA signal can be taken to be (ignoring diffraction)

$$CA(t) = \int P_{Laser}(t,x) R_{carrier}(t,x) dx.$$

$P_{Laser}(t, x)$ is time and position dependent laser power, the x direction being in a perpendicular direction to the writing direction. Likewise, $R_{carrier}(t, x)$ is the time and position dependent reflectivity of the carrier, which is dependent on the temperature and therefore inherent of the laser power of the radiation beam 5 during the pit/mark formation. Mathematically, the reflectivity is therefore convoluted with the laser power, and this makes it a relatively difficult task to establish a reliable model of the CA signal. Nevertheless, the teaching of the present invention demonstrates that simple measures from the sampled CA signal (or equivalent signals) can be used for obtaining an indication of the received power in an optically detectable effect as delivered by a power level of the applied radiation beam 5.

It is within the teaching of the present invention that an optical recording carrier 1 for recording information can comprise a dedicated area wherein control information indicative of a recording process utilising the present invention is provided. Thus, one or more look-up table(s) or calibration data, e.g. with parameters of the approximately linear dependency seen in FIG. 7, lower graph, or similar values for the reflectivity during recording of a pit/mark, can be stored on the carrier 1. In general, the control information can be values of recording parameters for the recording process, i.e. the control information comprises information related to the comparison of the first PS1 and second signal PS2.

FIG. 8 is a schematic channel of the reflected radiation pulses R1 and R2, the corresponding power signals PS1 and PS2, and the power control signal PCS derived from the power signals. Within the reflected radiation 8 are embedded the reflected first R1 and second R2 pulses from a start time portion and an end time portion, respectively, of the write pulse train 80. In particular, R1 can be the first reflected pulse from a specific write pulse train 80 under formation and R2 can be the last reflected pulse from the same write pulse train 80 as shown in FIG. 6 and further analyzed in FIG. 7. In the photo detection means 10 (see FIG. 2), the reflected radiation 8 comprising R1 and R2 is detected and corresponding CA signal comprising first PS1 and second PS2 power signals are transmitted to processing means, i.e. the central processing unit 50, for comparison. In particular, the comparison can be a height comparison, e.g. a ratio or a difference as shown in FIG. 7. Based on the comparison and the present target power value of the emitted radiation beam 5, a power error of the received power in an optically detectable effect as delivered by the beam 5 can be calculated. Depending on the size of the power error an adjusted power control signal PCS is transmitted to the laser drive 4 and in turn to the radiation source 4.

FIG. 9 is a flow-chart of a method according to the invention. The method comprises the step of:

S1: emitting a radiation beam 5, e.g. a laser beam, by a radiation source 4, the beam 5 being adapted to write information on the optical carrier 1 as optically detectable effects 90, i.e. pits or marks, S2: providing the radiation source 4 with a write strategy from a write strategy generator 26 for writing an optically detectable effect 90, the radiation source being arranged to emit a corresponding write pulse train 80 for writing the optically detectable effect 90, said write pulse train comprising at least an upper 81 and a lower 82 level of power, S3: detecting reflected radiation 8 from the optical carrier 1 by photo detection means, said photo detection means being capable of detecting a first reflected radiation pulse R1 from a start time portion of the write pulse train 80 and generating a corresponding first signal PS1 indicative of the power in the first pulse, S4: detecting a second reflected radiation pulse R2 by the photo detection means 10 from an end time portion of the write pulse train 80 and generating a corresponding second signal PS2 indicative of the power in the second pulse, and S5: comparing said first signal PS1 and said second signal PS2 by processing means 50 so as to obtain an indication of the received power in the optically detectable effect 90 as delivered by a power level 81 or 82 in the write pulse train 80.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. An optical recording drive adapted for recording data on an associated optical carrier, the optical recording drive comprising:

a radiation source capable of emitting a radiation beam, said beam being adapted to write information on the optical carrier as optically detectable effects, a write strategy generator capable of providing the radiation source with a write strategy for an optically detectable effect, the radiation source being arranged to emit a corresponding write pulse train for writing the optically detectable effect, said write pulse train comprising at least an upper and a lower level of power, photo detection means arranged to detect reflected radiation from the optical carrier, said photo detection means being capable of detecting a first reflected radiation beam pulse (R1) from a start time portion of the write pulse train and generating a corresponding first signal (PS1) indicative of the power in the first pulse, the photo detection means further being capable of detecting a second reflected radiation pulse (R2) from an end time portion of the write pulse train and generating a corresponding second signal (PS2) indicative of the power in the second pulse, and processing means for comparing said first signal (PS1) and said second signal (PS2) so as to obtain an indication of the received power in the optically detectable effect as delivered by a power level in the write pulse train wherein the processing means is adapted to obtain an indication of the received power in the optically detectable effect as delivered by a power level in the write pulse train by utilizing the time difference of said first signal (PS1) and said second signal (PS2).

2. An optical recording drive according to claim 1, wherein the first and the second signal (PS1; PS2) is a central aperture signal (CA) from the optical carrier.

3. An optical recording drive according to claim 2, wherein the optical drive is adapted to identify the first (PS1) and second (PS2) signal by analysis of the central aperture signal (CA) during writing.

4. An optical recording drive according to claim 2, wherein the optical drive is adapted to identify the first (PS1) and second (PS2) signal from data provided by write strategy generator and/or from data to the write strategy generator.

5. An optical recording drive according to claim 1, wherein the photo detection means has a sampling frequency of said first and/or said second signal (PS1; PS2) substantially larger than a clock frequency of the data to be recorded on the optical carrier.

6. An optical recording drive according to claim 1, wherein the upper power level in the write pulse train is adapted for erasing an optically detectable effect on the optical carrier.

7. A method for operating an optical recording drive adapted for recording data on an optical carrier, the method comprising the steps of:
   emitting a radiation beam by a radiation source, said beam being adapted to write information on the optical carrier as optically detectable effects,
   providing the radiation source with a write strategy from a write strategy generator for writing an optically detectable effect, the radiation source being arranged to emit a corresponding write pulse train for writing the optically detectable effect (90), said write pulse train comprising at least an upper and a lower level of power,
   detecting reflected radiation from the optical carrier by photo detection means, said photo detection means being capable of detecting a first reflected radiation pulse (R1) from a start time portion of the write pulse train and generating a corresponding first signal (PS1) indicative of the power in the first pulse,
   detecting a second reflected radiation pulse (R2) by the photo detection means from an end time portion of the write pulse train and generating a corresponding second signal (PS2) indicative of the power in the second pulse, and
   comparing said first signal (PS1) and said second signal (PS2) by processing means by calculating a ratio between said first signal (PS1) and said second signal (PS2) so as to obtain an indication of the received power in the optically detectable effect as delivered by a power level in the write pulse train.

8. The method according to claim 7, wherein said comparing step further comprises accessing control information for performing said comparing step, said control information being accessed from an area containing said control information indicative of a recording process, the control information comprising values of recording parameters for the recording process.

9. An optical recording drive adapted for recording data on an associated optical carrier (1), the optical recording drive comprising:

a radiation source capable of emitting a radiation beam, said beam being adapted to write information on the optical carrier as optically detectable effects,
a write strategy generator capable of providing the radiation source with a write strategy for an optically detectable effect, the radiation source being arranged to emit a corresponding write pulse train for writing the optically detectable effect, said write pulse train comprising at least an upper and a lower level of power,
photo detection means arranged to detect reflected radiation from the optical carrier, said photo detection means being capable of detecting a first reflected radiation beam pulse (R1) from a start time portion of the write pulse train and generating a corresponding first signal (PS1) indicative of the power in the first pulse,
the photo detection means further being capable of detecting a second reflected radiation pulse (R2) from an end time portion of the write pulse train and generating a corresponding second signal (PS2) indicative of the power in the second pulse, and
processing means for comparing said first signal (PS1) and said second signal (PS2) so as to obtain an indication of the received power in the optically detectable effect as delivered by a power level in the write pulse train,
wherein the processing means is adapted to compare the first signal (PS1) and the second signal (PS2) by calculating a ratio between said first signal (PS1) and said second signal (PS2).

10. An optical recording drive according to claim 9, wherein the first and the second signal (PS1; PS2) is a central aperture signal (CA) from the optical carrier.

11. An optical recording drive according to claim 10, wherein the optical drive is adapted to identify the first (PS1) and second (PS2) signal by analysis of the central aperture signal (CA) during writing.

12. An optical recording drive according to claim 10, wherein the optical drive is adapted to identify the first (PS1) and second (PS2) signal from data provided by write strategy generator and/or from data to the write strategy generator.

13. An optical recording drive according to claim 9, wherein the photo detection means has a sampling frequency of said first and/or said second signal (PS1; PS2) substantially larger than a clock frequency of the data to be recorded on the optical carrier.

14. An optical recording drive according to claim 9, wherein the upper power level in the write pulse train is adapted for erasing an optically detectable effect on the optical carrier.

15. An optical recording drive adapted for recording data on an associated optical carrier (1), the optical recording drive comprising:
   a radiation source capable of emitting a radiation beam, said beam being adapted to write information on the optical carrier as optically detectable effects,
   a write strategy generator capable of providing the radiation source with a write strategy for an optically detectable effect, the radiation source being arranged to emit a corresponding write pulse train for writing the optically detectable effect, said write pulse train comprising at least an upper and a lower level of power,
   photo detection means arranged to detect reflected radiation from the optical carrier, said photo detection means being capable of detecting a first reflected radiation beam pulse (R1) from a start time portion of the write pulse train and generating a corresponding first signal (PS1) indicative of the power in the first pulse, the photo detection means further being capable of detecting a second reflected radiation pulse (R2) from an end time portion of the write pulse train and generating a corresponding second signal (PS2) indicative of the power in the second pulse, and processing means for comparing said first signal (PS1) and said second signal (PS2) so as to obtain an indication of the received power in the optically detectable effect as delivered by a power level in the write pulse train, wherein the processing means is adapted to compare the first signal (PS1) and the second signal (PS2) by calculating a difference between said first signal (PS1) and said second signal (PS2).

16. An optical recording drive according to claim 15, wherein the first and the second signal (PS1; PS2) is a central aperture signal (CA) from the optical carrier.

17. An optical recording drive according to claim 16, wherein the optical drive is adapted to identify the first (PS1) and second (PS2) signal by analysis of the central aperture signal (CA) during writing.

18. An optical recording drive according to claim 16, wherein the optical drive is adapted to identify the first (PS1) and second (PS2) signal from data provided by write strategy generator and/or from data to the write strategy generator.

19. An optical recording drive according to claim 15, wherein the photo detection means has a sampling frequency of said first and/or said second signal (PS1; PS2) substantially larger than a clock frequency of the data to be recorded on the optical carrier.

20. An optical recording drive according to claim 15, wherein the upper power level in the write pulse train is adapted for erasing an optically detectable effect on the optical carrier.

21. A method for operating an optical recording drive adapted for recording data on an optical carrier, the method comprising the steps of:

emitting a radiation beam by a radiation source, said beam being adapted to write information on the optical carrier as optically detectable effects, providing the radiation source with a write strategy from a write strategy generator for writing an optically detectable effect, the radiation source being arranged to emit a corresponding write pulse train for writing the optically detectable effect (90), said write pulse train comprising at least an upper and a lower level of power, detecting reflected radiation from the optical carrier by photo detection means, said photo detection means being capable of detecting a first reflected radiation pulse (R1) from a start time portion of the write pulse train and generating a corresponding first signal (PS1) indicative of the power in the first pulse, detecting a second reflected radiation pulse (R2) by the photo detection means from an end time portion of the write pulse train and generating a corresponding second signal (PS2) indicative of the power in the second pulse, and comparing said first signal (PS1) and said second signal (PS2) by processing means by calculating a difference between said first signal (PS1) and said second signal (PS2) so as to obtain an indication of the received power in the optically detectable effect as delivered by a power level in the write pulse train.

22. The method according to claim 21, wherein said comparing step further comprises accessing control information for performing said comparing step, said control information being accessed from-an area containing said control information indicative of a recording process, the control information comprising values of recording parameters for the recording process.

\* \* \* \* \*